(12) United States Patent
Nagy et al.

(10) Patent No.: US 12,646,988 B2
(45) Date of Patent: Jun. 2, 2026

(54) HOLLOW COPPER ELECTRICAL CONDUCTORS

(71) Applicant: GM GLOBAL TECHNOLOGY OPERATIONS LLC, Detroit, MI (US)

(72) Inventors: Sayed Youssef Sayed Nagy, Troy, MI (US); Anil K. Sachdev, Rochester Hills, MI (US); Anthony Michael Coppola, Rochester Hills, MI (US); Jian Yao, Shanghai (CN); Chengwu Duan, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 319 days.

(21) Appl. No.: 18/364,868

(22) Filed: Aug. 3, 2023

(65) Prior Publication Data

US 2024/0235304 A1     Jul. 11, 2024

(30) Foreign Application Priority Data

Jan. 6, 2023    (CN) .......................... 202310023259.7

(51) Int. Cl.
| | |
|---|---|
| *H02K 3/22* | (2006.01) |
| *H02K 1/20* | (2006.01) |
| *H02K 3/24* | (2006.01) |
| *H02K 9/19* | (2006.01) |

(52) U.S. Cl.
CPC .................. *H02K 3/22* (2013.01); *H02K 1/20* (2013.01); *H02K 3/24* (2013.01); *H02K 9/19* (2013.01)

(58) Field of Classification Search
CPC .. H02K 3/22; H02K 3/24; H02K 9/19; H02K 1/20
See application file for complete search history.

(56) References Cited

U.S. PATENT DOCUMENTS

| 2,702,756 A | * | 2/1955 | Kurlandsky | ............. H01B 1/22 |
| | | | | 106/272 |
| 2,967,346 A | * | 1/1961 | Mcmaster | .............. H02K 15/16 |
| | | | | 310/40 MM |
| 3,724,236 A | * | 4/1973 | Gelbard | .................. F25B 39/02 |
| | | | | 62/515 |

(Continued)

FOREIGN PATENT DOCUMENTS

WO     WO2021062100 A1 *   6/2022   ......... H02K 15/0407

OTHER PUBLICATIONS

WO2021062100A1—Translation (Year: 2025).*

(Continued)

*Primary Examiner* — Maged M Almawri
*Assistant Examiner* — Ahmed F Seck

(57) ABSTRACT

A process for making a hollow electrical coil for an electric motor includes forming a sacrificial insert material into a coil shaped insert. The coil shaped insert is placed into a copper plating bath and a copper plated coil shaped member is removed from the copper plating bath. The sacrificial material is removed from within the copper plated coil shaped member to create a hollow passage through a hollow copper coil shaped member. An exterior of the hollow copper coil shaped member is coated with an insulating adhesive material and the copper coil shaped member is compressed until the insulating adhesive material is set.

17 Claims, 3 Drawing Sheets

(56) References Cited

U.S. PATENT DOCUMENTS

| | | | | |
|---|---|---|---|---|
| 3,775,264 | A * | 11/1973 | Bharucha | C25D 5/44 |
| | | | | 205/213 |
| 6,101,805 | A * | 8/2000 | Wassenhoven | F16F 1/022 |
| | | | | 19/112 |
| 6,915,054 | B2 * | 7/2005 | Wong | H01P 11/002 |
| | | | | 385/132 |
| 11,180,625 | B2 * | 11/2021 | Prebe | B29C 67/202 |
| 2006/0154485 | A1 * | 7/2006 | Li | H01L 21/461 |
| | | | | 438/692 |
| 2007/0068998 | A1 * | 3/2007 | Silliman | H01R 9/11 |
| | | | | 228/179.1 |
| 2014/0139057 | A1 * | 5/2014 | Ho | H02K 3/22 |
| | | | | 310/54 |
| 2016/0247620 | A1 * | 8/2016 | Murray | H02K 3/24 |
| 2017/0047803 | A1 * | 2/2017 | Scherer | H02K 15/35 |
| 2021/0265716 | A1 * | 8/2021 | Basit | C25D 1/02 |

OTHER PUBLICATIONS

Jin Huang, Enhanced Thermal Conductivity and Durability of a Paraffin Wax Nanocomposite Based on Carbon-Coated Aluminum Nanoparticles, May 31, 2017 (Year: 2017).*
U.S. Appl. No. 18/356,765, filed Jul. 21, 2023, Bobel et al.

* cited by examiner

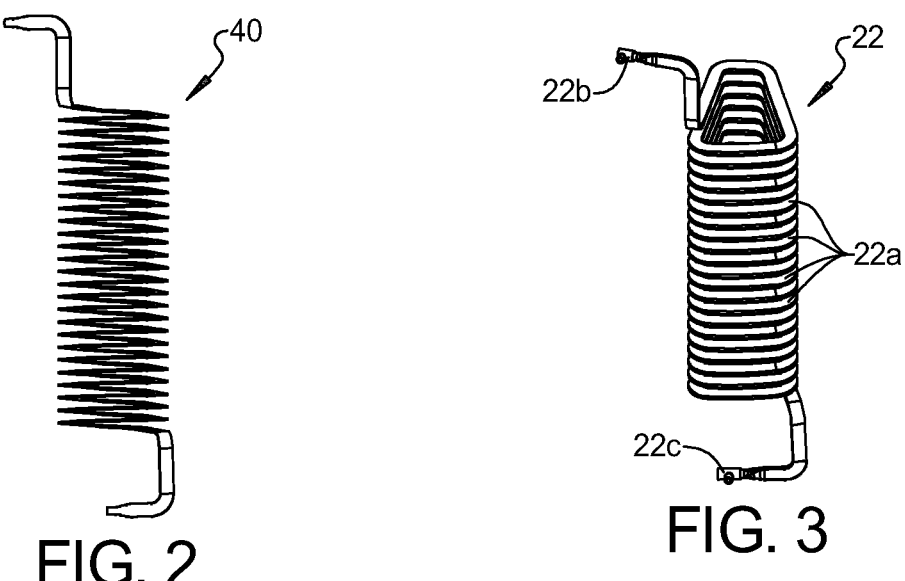
FIG. 2
FIG. 3
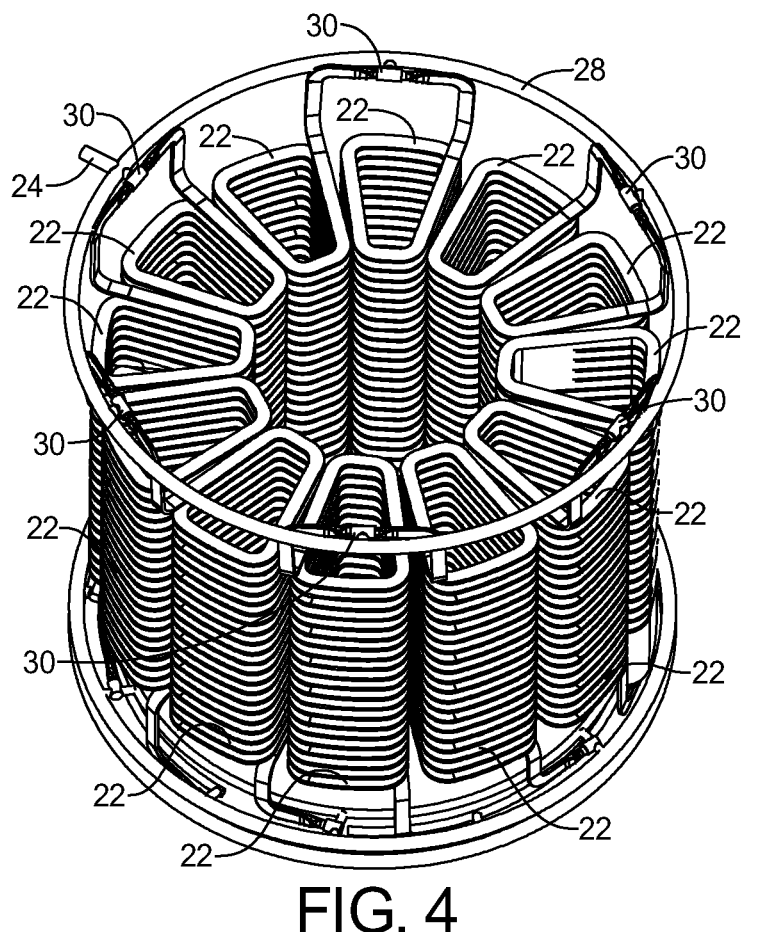
FIG. 4

PRIOR
ART

HOLLOW COPPER ELECTRICAL CONDUCTORS

CROSS-REFERENCE TO RELATED APPLICATIONS

This application claims the benefit of Chinese Patent Application No. 202310023259.7, filed on Jan. 6, 2023. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to hollow copper electrical conductor coils used for conducting current and flowing coolant in an electric motor and a method of making the hollow copper electrical conductor coils.

An axial flux motor (also known as an axial gap motor, or pancake motor) is a geometry of electric motor construction where the gap between the rotor and stator, and therefore the direction of magnetic flux between the two, is aligned parallel with the axis of rotation, rather than radially as with the concentric cylindrical geometry of the more common radial gap motor.

SUMMARY

A process for making a hollow electrical coil for an electric motor includes forming a sacrificial insert material into a coil shaped insert. The coil shaped insert is placed into a copper plating bath and a copper plated coil shaped member is removed from the copper plating bath. The sacrificial material is removed from within the copper plated coil shaped member to create a hollow passage through a hollow copper coil shaped member. An exterior of the hollow copper coil shaped member is coated with an insulating adhesive material and the copper coil shaped member is compressed until the insulating adhesive material is set.

According to a further aspect of the present disclosure, the sacrificial material includes a metal including one of tin, indium, zinc, aluminum and magnesium.

According to a further aspect of the present disclosure, the sacrificial material includes a conductive polymer including one of polyamides, epoxies, polyesters, polyethylenes, acrylics, polyphenylene sulfides, polycarbonate, and acrylonitrile butadiene styrene According to a further aspect of the present disclosure, the conductive material further includes conductive particles, including one of carbon-based particles, metal oxides and metal nitrides.

According to a further aspect of the present disclosure, the sacrificial material includes a conductive hard wax including one of paraffin wax, montan wax, and polyethylene wax.

According to a further aspect of the present disclosure, the conductive hard wax further includes a filler.

According to a further aspect of the present disclosure, the sacrificial material includes a polymer including one of polyethylene glycol, polyacrylamides, polyacrylic acid copolymer, and polyvinyl alcohol.

According to a further aspect of the present disclosure, the coil shaped insert is formed by one of casting and extruding a metal into a coil shape.

According to a further aspect of the present disclosure, the coil shaped insert is formed by one of extruding and electropolymerizing a polymer in a template.

According to a further aspect of the present disclosure, the coil shaped insert is formed by molding a polymer.

According to a further aspect of the present disclosure, the coil shaped insert is formed by 3D printing.

According to a further aspect of the present disclosure, removing the sacrificial material from the within the copper plated coil shaped member includes one of melting, burning, and dissolving the sacrificial material.

A process for making a hollow electrical coil for an electric motor includes forming an insert material into a coil shaped insert with a hollow passage therethrough. The coil shaped insert is placed into a copper plating bath. A copper plated coil shaped member is removed from the copper plating bath. An exterior of the hollow copper coil shaped member is coated with an insulating adhesive material and the copper coil shaped member is compressed until the insulating adhesive material is set.

According to a further aspect of the present disclosure, the coil shaped insert is formed by one of extruding and electropolymerizing a polymer in a template.

According to a further aspect of the present disclosure, the coil shaped insert is formed by molding a polymer.

According to a further aspect of the present disclosure, the coil shaped insert is formed by 3D printing.

According to another aspect of the present disclosure, a coil assembly for an electric motor includes a plurality of conductive coils arranged in an annular ring and each having a hollow passage therethrough. A coolant inlet passage is in communication with one end of the hollow passage in each of the conductive coils and a coolant outlet passage is in communication with a second end of the hollow passage in each of the conductive coils.

According to a further aspect of the present disclosure, the coolant inlet passage includes an annular ring connected to the one end of the hollow passage in each of the conductive coils.

According to a further aspect of the present disclosure, the coolant inlet passage includes an electrically conductive fitting connected between adjacent ones of the conductive coils.

According to a further aspect of the present disclosure, the coolant outlet passage includes an annular ring connected to the second end of the hollow passage in each of the conductive coils.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 2 is a side plan view of an example sacrificial insert for making the hollow electric conductor coils according to the principles of the present disclosure;

FIG. 3 is a perspective view of a stator coil made from a hollow electric conductor according to the principles of the present disclosure;

FIG. 4 is a partial perspective view of a connection of a coolant passage to the hollow electric coils according to the principles of the present disclosure;

In the drawings, reference numbers may be reused to identify similar and/or identical elements.

DETAILED DESCRIPTION

Figure 6:
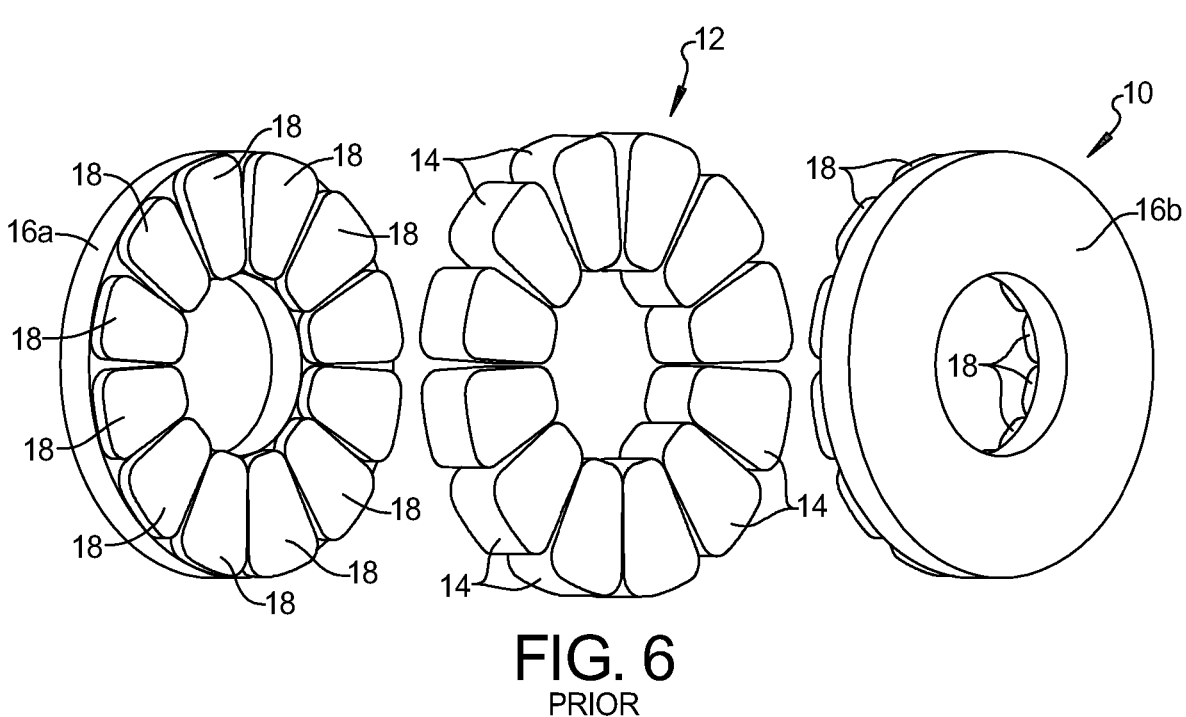
FIG. 6 is an exploded perspective view of components of an example axial flux motor.

With reference to FIG. 6 an exploded perspective view of components of a conventional axial flux motor 10 are shown. The axial flux motor 10 includes a stator 12 having a plurality of coils 14. A first rotor 16a opposes the stator 12 on one side and a second rotor 16b can oppose the stator 12 on a second side. The first and second rotors 16a, 16b include a plurality of permanent magnets 18 thereon. The operation of a radial flux motor 10 is well known in the art.

Figure 1:
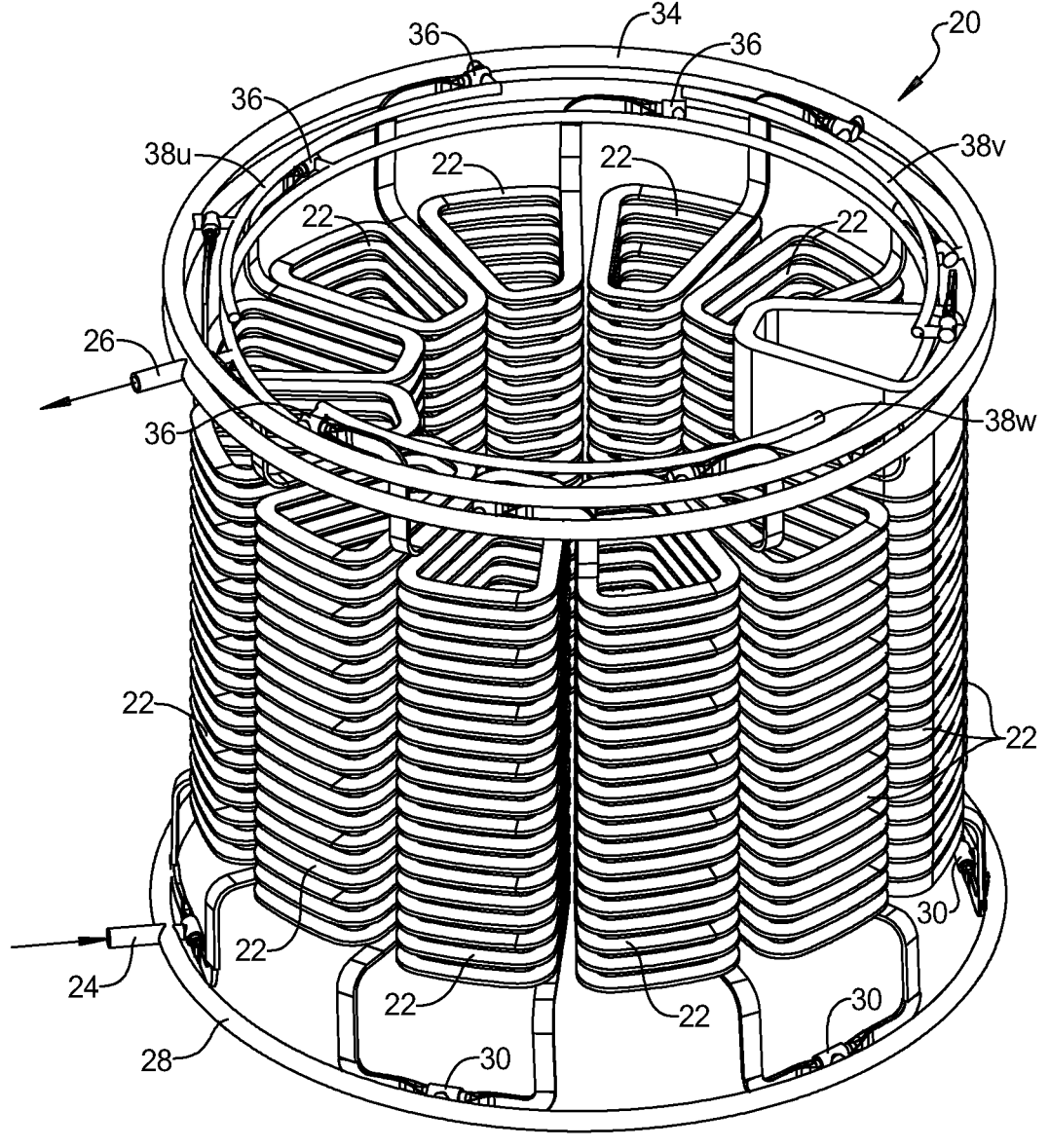
FIG. 1 is a perspective view of a stator coil assembly having hollow electric conductor coils connected to coolant passages according to the principles of the present disclosure.
Figure 5:
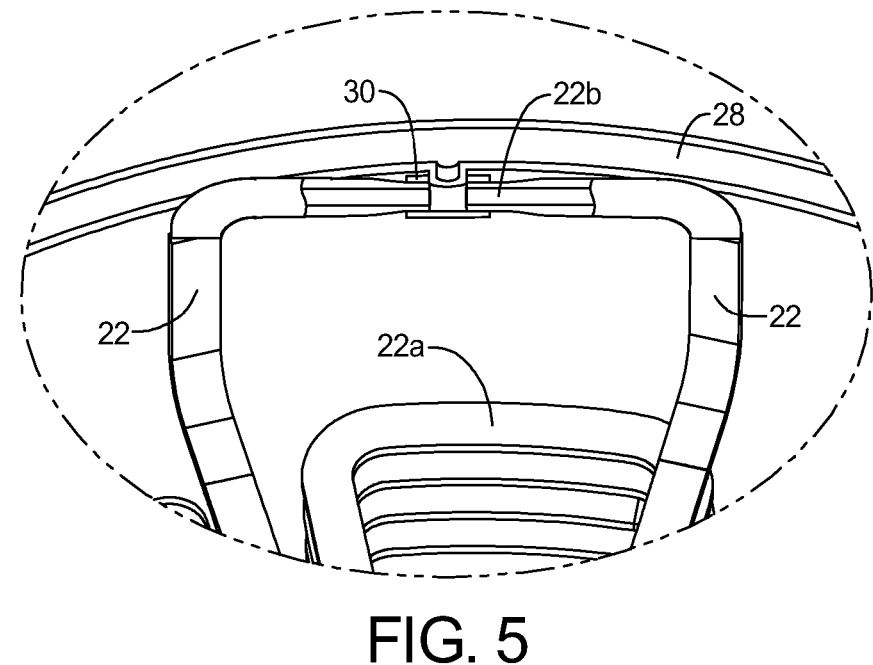
FIG. 5 is a detailed partial cutaway view of a connection of a coolant passage to the hollow electric coils according to the principles of the present disclosure.

With reference to FIG. 1, a coil assembly 20 is shown having hollow electric coils 22 connected to a coolant inlet 24 and a coolant outlet 26. The hollow electric coils 22 are connected to three different phases U, V, W as shown in FIG. 1 and as is known in the art. As best shown in FIG. 4, the coolant inlet 24 is connected to an annular ring 28 that includes a plurality of coil connectors 30 that are connected to adjacent hollow electric coils 22. As best shown in FIG. 5, the coil connectors 30 can provide fluid communication to each of the adjacent hollow electric coils 22 from the annular ring 28 as well as being made from copper for providing an electrical connection therebetween. The annular ring 28 can be made from a non-conductive material such as a plastic. With continued reference to FIG. 1, the coolant outlet 26 is connected to an annular ring 34 that includes a plurality of coolant connectors 36 that are connected to each of the hollow electric coils 22. The coolant connectors 36 provide fluid communication to each of the hollow electric coils 22 from the annular ring 34. The annular ring 34 can be made from a non-conductive material such as a plastic. Phase wirings 38U, 38V, 38W provide an electrical connection between hollow electric coils 22 that correspond to each of the phases U, V, W, as is known in the art.

A process for making a hollow electrical coil 22 according to the principles of the present disclosure will now be described. As shown in FIG. 2, a sacrificial insert material is formed into a coil shaped insert 40. The sacrificial material can include a metal including one of tin, indium, zinc, aluminum and magnesium. Accordingly, the coil shaped insert is formed by one of casting and extruding a metal into a coil shape. Alternatively, the sacrificial material can include a conductive polymer including one of polyamides, epoxies, polyesters, polyethylenes, acrylics, polyphenylene sulfides, polycarbonate, and acrylonitrile butadiene styrene. The conductive material can further include conductive particles, including one of carbon-based particles, metal oxides and metal nitrides. Further, the sacrificial material can include a conductive hard wax including one of paraffin wax, montan wax, and polyethylene. The conductive hard wax can include a conductive filler. The sacrificial material can also include a polymer including one of polyethylene glycol, polyacrylamides, polyacrylic acid copolymer, and polyvinyl alcohol. The coil shaped insert can be formed by one of extruding and electropolymerizing a polymer in a template. Alternatively, the coil shaped insert can be formed by molding the polymer. Finally, the coil shaped insert can be formed by 3-D printing.

The coil shaped insert can be placed into a copper plating bath wherein the coil shaped insert is copper plated. Copper plating is a known electrochemical process where a layer of copper is placed on a surface with the help of an electric current. At the beginning of the process, the material which is going to be plated is cleaned, all to prevent imperfections. Then an electric current is passed through a copper salt electrolyte solution.

The copper plated coil shaped member is then removed from the copper plating bath. The sacrificial material can then be removed from within the copper plated coil shaped member to create a hollow passage through a hollow copper coil shaped member. The removal of the sacrificial material from the within the copper plated coil shaped member can include one of melting, burning, and dissolving the sacrificial material. Melting can occur at a temperature below a melting temperature of copper and above a melting temperature of the sacrificial material. A pressure can be applied to one end to force the molten sacrificial material out of the hollow electric coil 22. Liquids such as water, acids, or other solvents can be used to dissolve the sacrificial material from within the hollow electric coil 22.

An exterior of the hollow copper coil shaped member can then be coated with an insulating adhesive material and the copper coil shaped member can be compressed until the insulating adhesive material is set, thus forming the hollow electric coil 22, as shown in FIG. 3. The hollow electric coil 22 includes a plurality of coil rings 22a, a first conductor end 22b and a second conductor end 22c each having an opening that communicate with the hollow passage through the hollow electric coil 22.

According to an alternative embodiment, the coil shaped insert 40 can be made from a thin layer of material and can include a hollow passage therethrough. The coil shaped insert 40 can be plugged at both ends and copper plated on an exterior surface, according to the process discussed above. The coil shaped insert 40 can remain within the copper plating and because the coil shaped insert 40 is hollow, the coolant passage is provided within the coil shaped insert and heat transfer can occur through the thin walled coil shaped insert to the copper plating. Therefore, according to the alternative embodiment, the step of removing the sacrificial material can be eliminated.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A process for making a coil assembly having hollow electrical coils for an electric motor, comprising:
   forming a plurality of hollow electrical coils by;
      forming a sacrificial insert material into a coil shaped insert;
      placing the coil shaped insert into a copper plating bath;
      removing a copper plated coil shaped member from the copper plating bath;
      removing the sacrificial insert material from within the copper plated coil shaped member to create a hollow passage through a hollow copper coil shaped member;
      coating an exterior of the hollow copper plated coil shaped member with an insulating adhesive material; and
      compressing the copper coil shaped member until the insulating adhesive material is set;
   forming the coil assembly by connecting an inlet coolant ring to a first end to the hollow electrical coils at a first end of the coil assembly and connecting an outlet coolant ring to a second end of the hollow electrical coils at a second end of the coil assembly; and
   electrically connecting a plurality of phase wirings to the plurality of hollow electrical coils adjacent to one of the inlet coolant ring and the outlet coolant ring.

2. The process for making a coil assembly for an electric motor according to claim 1, wherein the sacrificial insert material includes a metal including one of tin, indium, zinc, aluminum, and magnesium.

3. The process for making a coil assembly for an electric motor according to claim 1, wherein the sacrificial insert material includes a conductive polymer including one of polyamides, epoxies, polyesters, polyethylenes, acrylics, polyphenylene sulfides, polycarbonate, and acrylonitrile butadiene styrene.

4. The process for making a coil assembly for an electric motor according to claim 3, wherein the conductive polymer further includes conductive particles, including one of carbon-based particles, metal oxides and metal nitrides.

5. The process for making a coil assembly for an electric motor according to claim 1, wherein the sacrificial insert material includes a conductive hard wax including one of paraffin wax, montan wax, and polyethylene wax.

6. The process for making a coil assembly for an electric motor according to claim 5, wherein the conductive hard wax further includes a filler.

7. The process for making a coil assembly for an electric motor according to claim 1, wherein the sacrificial insert material includes a polymer including one of polyethylene glycol, polyacrylamides, polyacrylic acid copolymer, and polyvinyl alcohol.

8. The process for making a coil assembly for an electric motor according to claim 1, wherein the coil shaped insert is formed by one of casting and extruding a metal into a coil shape.

9. The process for making a coil assembly for an electric motor according to claim 1, wherein the coil shaped insert is formed by one of extruding and electropolymerizing a polymer in a template.

10. The process for making a coil assembly for an electric motor according to claim 1, wherein the coil shaped insert is formed by molding a polymer.

11. The process for making a coil assembly for an electric motor according to claim 1, wherein the coil shaped insert is formed by 3D printing.

12. The process for making a coil assembly for an electric motor according to claim 1, wherein removing the sacrificial insert material from the within the copper plated coil shaped member includes one of melting, burning, and dissolving the sacrificial insert material.

13. A process for making a coil assembly having hollow electrical coils for an electric motor, comprising:
   forming a plurality of hollow electrical coils by;
      forming an insert material into a coil shaped insert with a hollow passage therethrough;
      placing the coil shaped insert into a copper plating bath;
      removing a copper plated coil shaped member from the copper plating bath;
      coating an exterior of the hollow copper plated coil plated shaped member with an insulating adhesive material; and
      compressing the copper plated coil shaped member until the insulating adhesive material is set;
   forming the coil assembly by connecting an inlet coolant ring to a first end to the hollow electrical coils at a first end of the coil assembly and connecting an outlet coolant ring to a second end of the hollow electrical coils at a second end of the coil assembly; and
   electrically connecting a plurality of phase wirings to the plurality of hollow electrical coils adjacent to one of the inlet coolant ring and the outlet coolant ring.

14. The process for making a coil assembly for an electric motor according to claim 13, wherein the coil shaped insert is formed by one of extruding and electropolymerizing a polymer in a template.

15. The process for making a coil assembly for an electric motor according to claim 13, wherein the coil shaped insert is formed by molding a polymer.

16. The process for making a coil assembly for an electric motor according to claim 13, wherein the coil shaped insert is formed by 3D printing.

17. A coil assembly for an electric motor, comprising
   a plurality of conductive coils arranged in an annular ring and each having a hollow passage therethrough, the plurality of conductive coils having a first end and a second end;
   a coolant inlet ring disposed at a first longitudinal end of the coil assembly and connected to the first end of each of the plurality of conductive coils;
   a coolant outlet ring disposed at a second longitudinal end of the coil assembly and connected to the second end of each of the plurality of conductive coils; and a plurality of phase wirings electrically connected to the plurality of electrical coils adjacent to one of the coolant inlet ring and the coolant outlet ring.

* * * * *